(12) United States Patent
Kuroda et al.

(10) Patent No.: US 10,350,964 B2
(45) Date of Patent: Jul. 16, 2019

(54) AIR CONDITIONING DEVICE FOR VEHICLE

(71) Applicant: Panasonic Intellectual Property Management Co., Ltd., Osaka (JP)

(72) Inventors: Kentaro Kuroda, Osaka (JP); Yoshitoshi Noda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 86 days.

(21) Appl. No.: 15/489,912

(22) Filed: Apr. 18, 2017

(65) Prior Publication Data
US 2017/0217287 A1    Aug. 3, 2017

Related U.S. Application Data

(63) Continuation of application No. PCT/JP2015/005893, filed on Nov. 27, 2015.

(30) Foreign Application Priority Data

Dec. 24, 2014  (JP) .................................. 2014-260639
Sep. 9, 2015   (JP) .................................. 2015-177551

(51) Int. Cl.
*B60H 1/03*   (2006.01)
*B60H 1/00*   (2006.01)
*B60H 1/32*   (2006.01)

(52) U.S. Cl.
CPC ........... *B60H 1/03* (2013.01); *B60H 1/00921* (2013.01); *B60H 1/3227* (2013.01); *B60H 2001/00928* (2013.01); *B60H 2001/00949* (2013.01)

(58) Field of Classification Search
CPC .... B60H 1/03; B60H 1/00921; B60H 1/3227; B60H 2001/00928; B60H 2001/00949
See application file for complete search history.

(56) References Cited

U.S. PATENT DOCUMENTS 5,899,086 A  *  5/1999  Noda ................. B60H 1/00914
                                            165/42
5,910,157 A  *  6/1999  Noda ................. B60H 1/00914
                                            165/43
(Continued)

FOREIGN PATENT DOCUMENTS

CN      105408142 A      3/2016
EP      3025885 A1       6/2016
(Continued)

OTHER PUBLICATIONS

Description JP2006327428 machine translation.*
(Continued)

*Primary Examiner* — Keith M Raymond
*Assistant Examiner* — Gordon A Jones
(74) *Attorney, Agent, or Firm* — Pearne & Gordon LLP

(57) ABSTRACT

A vehicle air conditioner includes: a coolant-path coupled with a cooling-portion of a heat-generating component of a vehicle, for circulating a coolant; and a refrigerant-path for circulating a refrigerant. The conditioner further includes: a first water-refrigerant heat exchanger for vaporizing the refrigerant by thermal-exchange between the coolant and a low-temperature and low-pressure refrigerant; a second water-refrigerant heat exchanger for condensing the refrigerant by a thermal-exchange between the coolant and a high-temperature and high-pressure refrigerant; and a heater core for heating air to be blown into the vehicle's interior. The coolant-path includes: a branching-portion for causing a coolant's flow to branch off; a joining-portion for causing the branched flows to join; and first and second parts that (Continued)

branch off at the branching-portion and join at the joining-portion. The first and second water-refrigerant heat exchangers are disposed in the first and second parts of the coolant-path, respectively.

4 Claims, 7 Drawing Sheets

(56) References Cited

U.S. PATENT DOCUMENTS

| | | | | |
|---|---|---|---|---|
| 7,165,421 | B2* | 1/2007 | Tsugawa | B60H 1/3225 62/527 |
| 2005/0039878 | A1 | 2/2005 | Meyer et al. | |
| 2010/0281901 | A1* | 11/2010 | Kawase | B60H 1/00885 62/238.7 |
| 2015/0143835 | A1* | 5/2015 | Matsumoto | F25B 40/02 62/324.1 |
| 2016/0001635 | A1 | 1/2016 | Noda et al. | |
| 2016/0001636 | A1 | 1/2016 | Terada et al. | |
| 2016/0031291 | A1 | 2/2016 | Enomoto et al. | |
| 2016/0137032 | A1 | 5/2016 | Kuroda et al. | |

FOREIGN PATENT DOCUMENTS

| | | |
|---|---|---|
| JP | 10-076837 A | 3/1998 |
| JP | 2006-327428 A | 12/2006 |
| JP | 2014-172429 A | 9/2014 |
| JP | 2014-201224 A | 10/2014 |
| WO | 2014/136447 A1 | 9/2014 |
| WO | 2015/011919 A1 | 1/2015 |

OTHER PUBLICATIONS

International Search Report of PCT application No. PCT/JP2015/005893 dated Mar. 1, 2016.
Extended European Search Report dated Dec. 8, 2017 for the related European Patent Application No. 15872155.5.
English Translation of Chinese Search Report dated Dec. 17, 2018 for the related Chinese Patent Application No. 201580057660.6.

* cited by examiner

AIR CONDITIONING DEVICE FOR VEHICLE

BACKGROUND

1. Technical Field

The present disclosure relates to air conditioning devices for vehicles.

2. Description of the Related Art

Conventionally, hot-water heaters have been used, as heaters for vehicles, each of which is to heat the interior of a vehicle by utilizing heat of its engine coolant which has become high temperatures. Moreover, heat pump coolers have been used, as conventional coolers for vehicles, each of which is to cool air sending into the interior of a vehicle through use of a heat pump.

Japanese Patent Unexamined Publication No. H10-76837 discloses a vehicle air conditioner including a hot-water heater which has an additional configuration for heating a coolant of the hot-water heater through use of a heat pump. Such a hot-water heater can improve heating performance thereof, over other conventional hot-water heaters each of which uses only heat of the engine coolant. The vehicle air conditioner disclosed in Japanese Patent Unexamined Publication No. H10-76837 is configured such that the coolant flows through an engine cooling portion, a condenser of a heat pump cycle, a heater core, and an evaporator of the heat pump cycle, in this order.

SUMMARY

A vehicle air conditioner according to the present disclosure includes: a coolant path, a refrigerant path, a compressor, a first water-refrigerant heat exchanger, a second water-refrigerant heat exchanger, and a heater core. The coolant path is coupled with a cooling portion of a heat-generating component of a vehicle, and circulated a coolant for transferring heat. The refrigerant path circulates a refrigerant. The compressor is disposed in the refrigerant path, and compresses the refrigerant. The first water-refrigerant heat exchange is disposed in the coolant path and the refrigerant path, and causes the refrigerant to vaporize, by performing a thermal exchange between the coolant and a low-temperature and low-pressure refrigerant that is produced by reducing a pressure of the refrigerant when the refrigerant passes through a first expansion valve disposed in the refrigerant path. The second water-refrigerant heat exchanger is disposed in the coolant path and the refrigerant path, and condenses the refrigerant by performing a thermal exchange between the coolant and a high-temperature and high-pressure refrigerant that is produced by compressing the refrigerant with the compressor after the refrigerant has passed through the first water-refrigerant heat exchanger. The heater core is disposed in the coolant path, and heats air to be blown into an interior of the vehicle. The coolant path includes: a branching portion for causing the coolant to branch off into two flows; a joining portion for causing the two flows of the coolant to join, with the two flows having branched off at the branching portion; and first and second parts of the coolant path that branches off at the branching portion and then joins at the joining portion. The first water-refrigerant heat exchanger is disposed in the first part of the coolant path; a second water-refrigerant heat exchanger is disposed in the second part of the coolant path.

In accordance with the present disclosure, it is possible to provide the vehicle air conditioner that can improve heating power of the configuration for heating the interior of the vehicle and reduce pressure loss of the coolant in the coolant path.

DETAILED DESCRIPTION OF PREFERRED EMBODIMENTS

Figure 1:
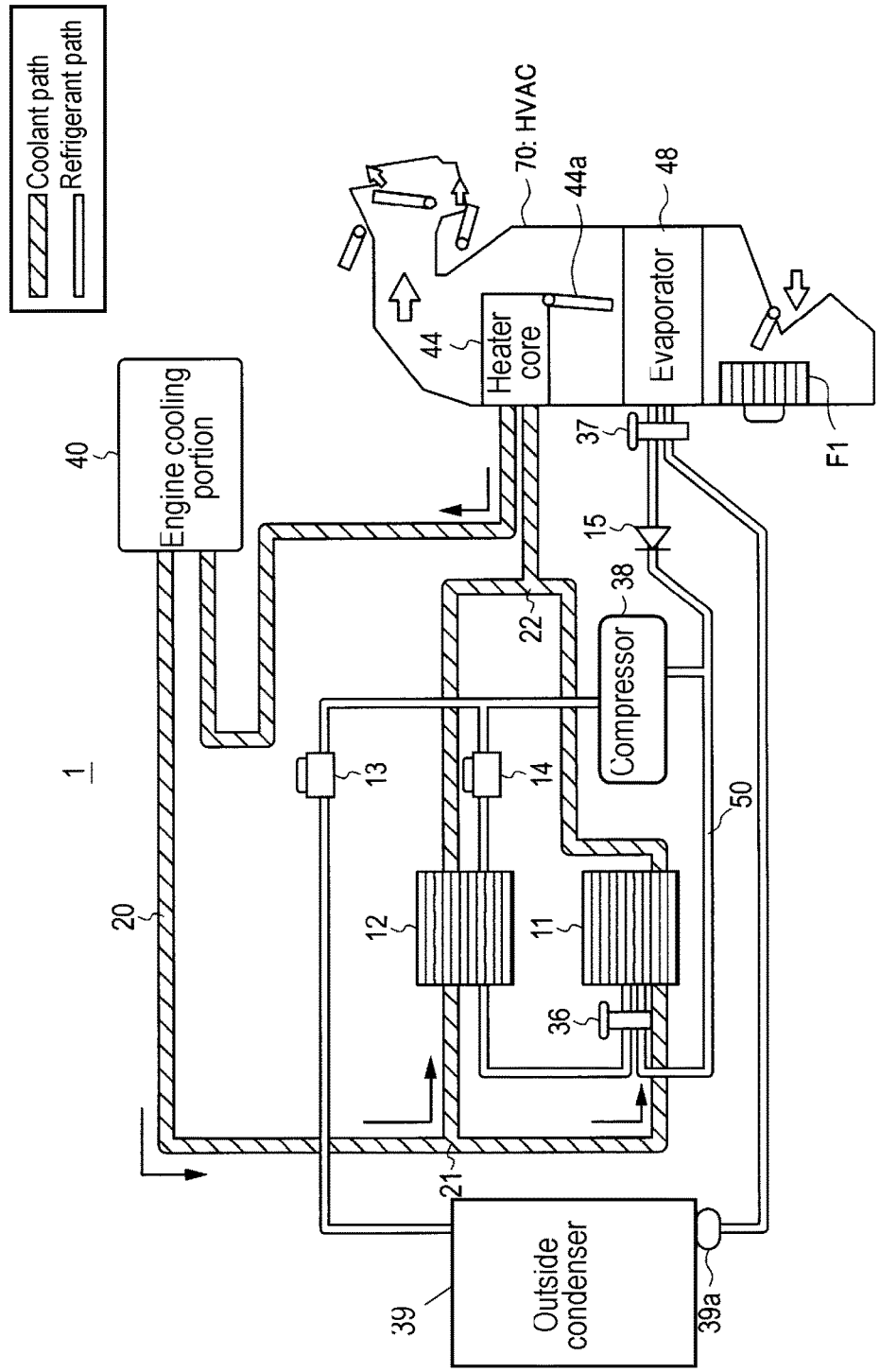
FIG. 1 is a view of a configuration of a vehicle air conditioner according to a first embodiment.

Prior to descriptions of embodiments according to the present disclosure, problems in conventional technologies will be briefly explained.

In the configuration disclosed in Japanese Patent Unexamined Publication No. H10-76837, a condenser and an evaporator are coupled with each other in series in a path of a coolant. In each of the condenser and the evaporator, a path of the coolant is formed which has a small cross section in order to enhance its heat exchange efficiency. For this reason, such a series coupling of the condenser and the evaporator in the path of the coolant, causes a large pressure loss of the coolant in the path.

Moreover, a mounting space where a vehicle air conditioner is mounted in a vehicle is so limited that constituent elements of the air conditioner are required to be downsized.

However, downsizing of the condenser and the evaporator requires further enhancement of their heat exchange efficiency, by further reducing the cross section of the path of the coolant. In this case, if the condenser and the evaporator are coupled with each other in series in the path of the coolant, the pressure loss of the coolant in the path becomes still larger. As a result, the downsizing of the condenser and the evaporator reaches a limit.

Hereinafter, descriptions will be made regarding embodiments of a vehicle air conditioner which can improve heating performance of its configuration for heating the interior of a vehicle by means of a coolant, and reduce pressure loss of the coolant in a path.

First Exemplary Embodiment

Configuration of Vehicle Air Conditioner

Vehicle air conditioner 1 according to a first embodiment of the present disclosure will be described in detail with reference to FIG. 1, hereinafter.

Vehicle air conditioner 1 is a device which is mounted on a vehicle equipped with an engine (internal combustion engine) serving as a heat-generating component, and is intended to perform air-conditioning of the interior of the vehicle. The conditioning includes heating and cooling.

Vehicle air conditioner 1 includes: compressor 38, engine cooling portion (corresponding to a cooling portion of the heat-generating component) 40, heater core 44, evaporator 48, expansion valve 37, outside condenser 39, check valve 15, first water-refrigerant heat exchanger 11, second water-refrigerant heat exchanger 12, on-off valves 13 and 14, expansion valve 36, and coolant path 20 and refrigerant path 50 which couple these components described above. On-off valves 13 and 14 correspond to an example of switches which switch between the refrigerant paths. Heater core 44 and evaporator 48 are disposed in a suction air path of Heating, Ventilation, and Air Conditioning (HVAC) 70. HVAC 70 is equipped with fan F1 to cause suctioned air to flow.

Compressor 38 is driven by dynamic power of the engine so as to compress a suctioned refrigerant and to allow it to have a high temperature and pressure, then to discharge the thus-compressed refrigerant. A low-pressure refrigerant is fed from either first water-refrigerant heat exchanger 11 or evaporator 48, and is suctioned into compressor 38 via a junction pipe. The thus-compressed refrigerant is conveyed to either second water-refrigerant heat exchanger 12 or outside condenser 39.

Engine cooling portion 40 includes: a water jacket for passing a coolant through the surrounding portion of the engine, and a pump for passing the coolant through the water jacket, thereby releasing heat from the engine into the coolant that flows through the water jacket. The pump is rotated by dynamic power of the engine, for example. Engine cooling portion 40 may be equipped with a radiator which releases heat to the outside when the amount of the heat exhausted from the engine increases.

The coolant is an antifreeze liquid, such as a Long Life Coolant (LLC), for example, which is a liquid used for transferring heat.

The conveying equipment for the coolant can be only the pump of engine cooling portion 40. This configuration allows reduction in cost of the vehicle air conditioner, and reduction in the mounting space of the conditioner. To increase the conveying capacity for the coolant, another pump may be added at another position in coolant path 20.

Heater core 44 is a device for performing a heat exchange between the coolant and air, and is disposed in the suction air path of HVAC 70 for supplying air into the interior of the vehicle. Heater core 44 is supplied with the coolant that has been heated, thereby releasing heat to suction air (blowing air to the interior) that is conveyed into the interior in a heating mode. Heater core 44 is capable of controlling the degree of opening of door 44a so as to regulate the amount of the air that passing there. Door 44a is openable and closeable under electrical control. Door 44a is also referred to as a mix door.

Evaporator 48 is a device for performing a heat exchange between air and a low-temperature and low-pressure refrigerant, and is disposed in the suction air path of HVAC 70. The low-temperature and low-pressure refrigerant is caused to flow through evaporator 48 in either a cooling mode or a dehumidifying mode, thereby cooling the suction air to be supplied to the interior of the vehicle.

Expansion valve 37 expands the high pressure refrigerant and allows it to have a low temperature and pressure, and discharges it to evaporator 48. Expansion valve 37 is disposed in the vicinity of evaporator 48. Expansion valve 37 may be a Thermal Expansion Valve (TXV) which automatically regulates the flow rate of the refrigerant in accordance with the temperature of the refrigerant at the refrigerant outlet of evaporator 48.

Outside condenser 39 includes a path for passing the refrigerant and a path for passing air, and is disposed in an engine room and near the front end of the vehicle, so as to perform a heat exchange between the refrigerant and the outside air. A high-temperature and high-pressure refrigerant is caused to flow through outside condenser 39 in either the cooling mode or the dehumidifying mode, thereby releasing heat from the refrigerant to the outside air. The outside air is blown to outside condenser 39 through use of, for example, a fan. On the refrigerant outlet side of outside condenser 39, liquid tank 39a may be disposed.

First water-refrigerant heat exchanger 11 includes a path for passing the low-temperature and low-pressure refrigerant and to path for passing the coolant, so as to perform a heat exchange between the refrigerant and the coolant. The low-temperature and low-pressure refrigerant is discharged from expansion valve 36 to first water-refrigerant heat exchanger 11, in a predetermined operation mode, thereby transferring heat from the coolant to the low-temperature and low-pressure refrigerant. This allows first water-refrigerant heat exchanger 11 to cause the low-temperature and low-pressure refrigerant to vaporize.

The coolant inlet of first water-refrigerant heat exchanger 11 communicates with engine cooling portion 40 via coolant path 20; the coolant outlet of the exchanger communicates with heater core 44 via coolant path 20. The refrigerant inlet of first water-refrigerant heat exchanger 11 communicates with expansion valve 36 via refrigerant path 50; the refrigerant outlet of the exchanger communicates with refrigerant path 50 that joins the suction port of compressor 38.

Second water-refrigerant heat exchanger 12 includes a path for passing the high-temperature and high-pressure refrigerant and a path for passing the coolant, so as to perform a neat exchange between the refrigerant and the coolant. The high-temperature and high-pressure refrigerant is conveyed from compressor 38 to second water-refrigerant heat exchanger 12 in a predetermined operation mode, thereby releasing heat from the high-temperature and high-pressure refrigerant to the coolant. When the temperature of the coolant is low, second water-refrigerant heat exchanger 12 causes the high-temperature and high-pressure refrigerant to condense.

The coolant inlet of second water-refrigerant heat exchanger 12 communicates with engine cooling portion 40 via coolant path 20; the coolant outlet of the exchanger communicates with heater core 44 via coolant path 20. The refrigerant inlet of second water-refrigerant heat exchanger 12 communicates with on-off valve 14 via refrigerant path 50; the refrigerant outlet of the exchanger communicates with expansion valve 36 via refrigerant path 50.

Expansion valve 36 expands the high-pressure refrigerant and allows it to have a low temperature and pressure, and then discharge it to first water-refrigerant heat exchanger 11. Expansion valve 36 is disposed in the vicinity of first water-refrigerant heat exchanger 11. Expansion valve 36 may be a Thermal Expansion Valve (TXV) which automatically regulates the flow rate of the refrigerant in accordance with the temperature of the refrigerant at the refrigerant outlet of first water-refrigerant heat exchanger 11.

Check valve 15 is a valve that prevents the refrigerant, which has been fed from first water-refrigerant heat exchanger 11, from flowing into evaporator 48 when the air conditioner operates in an operation mode in which the refrigerant is not allowed to flow into both outside condenser 39 and evaporator 48. Cheek valve 15 is disposed between evaporator 48 and the joining point of three paths, i.e., a refrigerant inlet path of compressor 38, a refrigerant outlet path of first water-refrigerant heat exchanger 11, and a refrigerant outlet path of evaporator 48.

On-off valve 13 is a valve to switch between opening and closing of refrigerant path 50 via electrical control, for example. On-off valve 13 is a solenoid-controlled valve, for example.

On-off valve 14 is a valve to switch between opening and closing of refrigerant path 50 via electrical control, for example. On-off valve 14 is a solenoid-controlled valve, for example.

Refrigerant path 50 includes a first refrigerant path for circulating the refrigerant from compressor 38, through second water-refrigerant heat exchanger 12, expansion valve 36, and first water-refrigerant heat exchanger 11, to compressor 38, in this order. Moreover, refrigerant path 50 includes a second refrigerant path for circulating the refrigerant from compressor 38, through outside condenser 39, expansion valve 37, and evaporator 48, to compressor 38, in this order. On-off valve 13 is disposed at a midway point of the second refrigerant path; on-off valve 14 is disposed at a midway point of the first refrigerant path. When on-off valve 13 is opened and yet when on-off valve 14 is closed, the refrigerant in the first refrigerant path stops flowing, and the refrigerant in the second refrigerant path starts flowing. When on-off valve 13 is closed and yet when on-off valve 14 is opened, the refrigerant in the second refrigerant path stops flowing, and the refrigerant in the first refrigerant path starts flowing.

On-off valves 13 and 14 can be replaced with one three-way valve. Such a three-way valve includes one inlet for receiving the refrigerant and two outlets for feeding the refrigerant. For feeding the refrigerant, one of the two outlets can be selected by switching via electrical control. In cases where on-off valve 13 (switch) and on-off valve 14 (switch) are replaced with the three-way valve, the refrigerant inlet of the three-way valve is coupled with the second water-refrigerant heat exchanger 12 side, and the other is coupled with the outside condenser 39 side.

Coolant path 20 is a path for circulating the coolant through engine cooling portion 40, first water-refrigerant heat exchanger 11, second water-refrigerant heat exchanger 12, and heater core 44. Coolant path 20 includes: branching portion 21 where the flow of the coolant branches off into two coolants-flows; joining portion 22 where the two coolant-flows having branched off at branching portion 21 join again; first and second parts which are disposed in parallel between branching portion 21 and joining portion 22. Branching portion 21 is disposed downstream from engine cooling portion 40, while joining portion 22 is disposed upstream of heater core 44. The coolant fed from engine cooling portion 40 flows through two parts (the first and second parts) of coolant path 20 which branches off into the two parts at branching portion 21, resulting in the formation of the two separate coolant-flows. Such two coolant-flows pass through first water-refrigerant heat exchanger 11 and second water-refrigerant heat exchanger 12, respectively. After that, the two coolant-flows join again at joining portion 22 to form a joined coolant-flow. Then, the thus-joined coolant-flow is conveyed to heater core 44. That is, first water-refrigerant heat exchanger 11 and second water-refrigerant heat exchanger 12 are respectively disposed in the first and second parts of coolant path 20. The first and second parts are disposed in parallel between engine cooling portion 40 and heater core 44.

Operation of Vehicle Air Conditioner

Next, operations of vehicle air conditioner 1 will be described in detail with reference to FIG. 1, hereinafter.

Vehicle air conditioner 1 operates in an operation mode which is selected, by switching, from some operation modes such as a heating mode, temperature-controlling mode, cooling mode, and other modes. In the heating mode, the interior of a vehicle is heated without operation of the heat pump. In the cooling mode, the interior of the vehicle is cooled through the action of the heat pump. In addition, the temperature-controlling mode can also be selected in which the temperature and humidity of air is controlled through an appropriate combination of dehumidifying and cooling of the air via a low temperature refrigerant, and heating of the air via a high temperature coolant. Hereinafter, the heating mode and the cooling mode are described as typical examples.

Heating Mode

In the heating mode, on-off valve 13 is switched to a closed state while on-off valve 14 is switched to an open state. Moreover, door 44a of heater core 44 is opened (fully opened, for example), and compressor 38 is driven.

The functioning of compressor 38 causes the refrigerant to circulate through second water-refrigerant heat exchanger 12, expansion valve 36, first water-refrigerant heat exchanger 11, and compressor 38, in this order. Specifically, the high-temperature and high-pressure refrigerant, which has been compressed by compressor 38, releases heat to the coolant in second water-refrigerant heat exchanger 12. This causes the refrigerant to condense. In expansion valve 36, the thus-condensed refrigerant is caused to expand into a low-temperature and low-pressure refrigerant, and is conveyed to first water-refrigerant heat exchanger 11. Then, in first water-refrigerant heat exchanger 11, the low-temperature and low-pressure refrigerant absorbs heat from the coolant, which causes the refrigerant to vaporize. The thus-vaporized low-pressure refrigerant is suctioned and compressed by compressor 38.

The coolant circulates through engine cooling portion 40, first water-refrigerant heat exchanger 11 or second water-refrigerant heat exchanger 12, and heater core 44, in this order. In this circulation, the flow of the coolant fed from engine cooling portion 40 branches off into two coolant-flows at branching portion 21 of coolant path 20. Thus, the coolant-flows are separately fed into first water-refrigerant heat exchanger 11 and second water-refrigerant heat exchanger 12. After having passed separately through first water-refrigerant heat exchanger 11 and second water-refrigerant heat exchanger 12, the coolant-flows join at joining portion 22 of coolant path 20, and then the thus-joined coolant is then conveyed to heater core 44.

The coolant of one of the two coolant-flows, which has branched off at branching portion 21 of coolant path 20, absorbs heat from the refrigerant so as to cause the refrigerant to condense in second water-refrigerant heat exchanger 12, which thereby heats the coolant. The coolant of the other of the two coolant-flows, which has branched off at branching portion 21 of coolant path 20, releases heat to the refrigerant so as to cause the refrigerant to vaporize in first water-refrigerant heat exchanger 11, which thereby cools the coolant. Then, the coolant having been heated in second water-refrigerant heat exchanger 12 and the coolant having been cooled in first water-refrigerant heat exchanger 11, join at joining portion 22 of coolant path 20. The thus-joined coolant is conveyed to heater core 44. The amount of the temperature rise of the coolant heated in second water-refrigerant heat exchanger 12 is larger than the amount of the temperature drop of the coolant cooled in first water-refrigerant heat exchanger 11, resulting in a sufficient heating of the coolant that is conveyed to heater core 44. Accordingly, in heater core 44, the coolant can sufficiently heat the suction air to be blown to the interior of the vehicle.

The coolant fed from first water-refrigerant heat exchanger 11 and the coolant fed from second water-refrigerant heat exchanger 12, join at joining portion 22 of coolant path 20. Accordingly, in the heating mode, the function of the heat pump is hardly performed. In the function of the heat pump, heat is transferred from a low temperature portion (first water-refrigerant heat exchanger 11) of the heat pump to a high temperature portion (second water-refrigerant heat exchanger 12) of the heat pump, and the transferred heat is used for the heating. The heat used for the heating is mainly given by converting the dynamic power applied to compressor 38 from the outside. It may wrongly be thought that, in view of an amount of heat, heating like this is similar to heating of a coolant through use of an electric heater. However, compared to use of such an electric heater, the use of the configuration according to the first embodiment is capable of supplying a very large amount of heat, e.g. several-fold or dozen-or-so-fold, to the coolant. This can achieve a high heating capacity.

The reason for this is as follows: With the electric heater, electrical energy is directly converted to the amount of the heat. This limits the amount of current which is allowed to flow into the electric heater, resulting in a limitation on the maximum available amount of heat that the electric heater can generate. In contrast, with compressor 38, the dynamic power supplied from the outside is used to give motion for the compressor to compress the refrigerant, which allows compressor 38 to receive a high dynamic power without upsizing of compressor 38. Compressor 38 operates by the dynamic power supplied from the engine. Incidentally, it is practically difficult for the electric heater to receive a high electric power that is comparable to the dynamic power from the engine. This is because such a high power requires that the electric heater be greatly upsized to have a configuration capable of withstanding a large amount of the electric current. Therefore, with the configuration according to the first embodiment, even though the function of the heat pump is not used in this case, supplying compressor 38 with a large amount of either the electric power or the dynamic power can achieve a higher heating capacity than is obtained through use of the electric heater.

Moreover, in vehicle air conditioner 1 according to the first embodiment, the flow of the coolant branches off into two coolant-flows which separately flow in parallel through first water-refrigerant heat exchanger 11 and second water-refrigerant heat exchanger 12. This can reduce an increase in total coolant flow-resistance that is the sum of coolant flow-resistance of first water-refrigerant heat exchanger 11 and coolant flow-resistance of second water-refrigerant heat exchanger 12, even in cases where first water-refrigerant heat exchanger 11 and second water-refrigerant heat exchanger 12 are downsized. Therefore, in accordance with the embodiment, it is possible to downsize first water-refrigerant heat exchanger 11 and second water-refrigerant heat exchanger 12, without an increase in pressure loss of the coolant.

Cooling Mode

In the cooling mode, on-off valve 13 is switched to an open state, on-off valve 14 is switched to a closed state, and expansion valve 36 is switched to a closed state. Moreover, door 44 $a$ of heater core 44 is totally closed, and compressor 38$is$ driven. The functioning of compressor 38 causes the refrigerant to circulate through outside condenser 39, expansion valve 37, evaporator 48, and compressor 38, in this order. The high-temperature and high-pressure refrigerant, which has been compressed by compressor 38, releases heat to air in outside condenser 39, which causes the refrigerant to condense. Subsequently, in expansion valve 37, the thus-condensed refrigerant expands into a low-temperature and low-pressure refrigerant, and is conveyed to evaporator 48. In evaporator 48, a heat exchange is performed between the low-temperature and low-pressure refrigerant and the air to be blown into the interior of the vehicle, which thereby cools the air to be blown into the interior and causes the low-pressure refrigerant to vaporize. The thus-vaporized low-pressure refrigerant is suctioned and compressed by compressor 38.

These operations allow the interior of the vehicle to be sufficiently cooled.

Second Exemplary Embodiment

Configuration of Vehicle Air Conditioner

Vehicle air conditioner 2 according to a second embodiment of the present disclosure will be described in detail with reference to FIG. 2, hereinafter.

Figure 2:
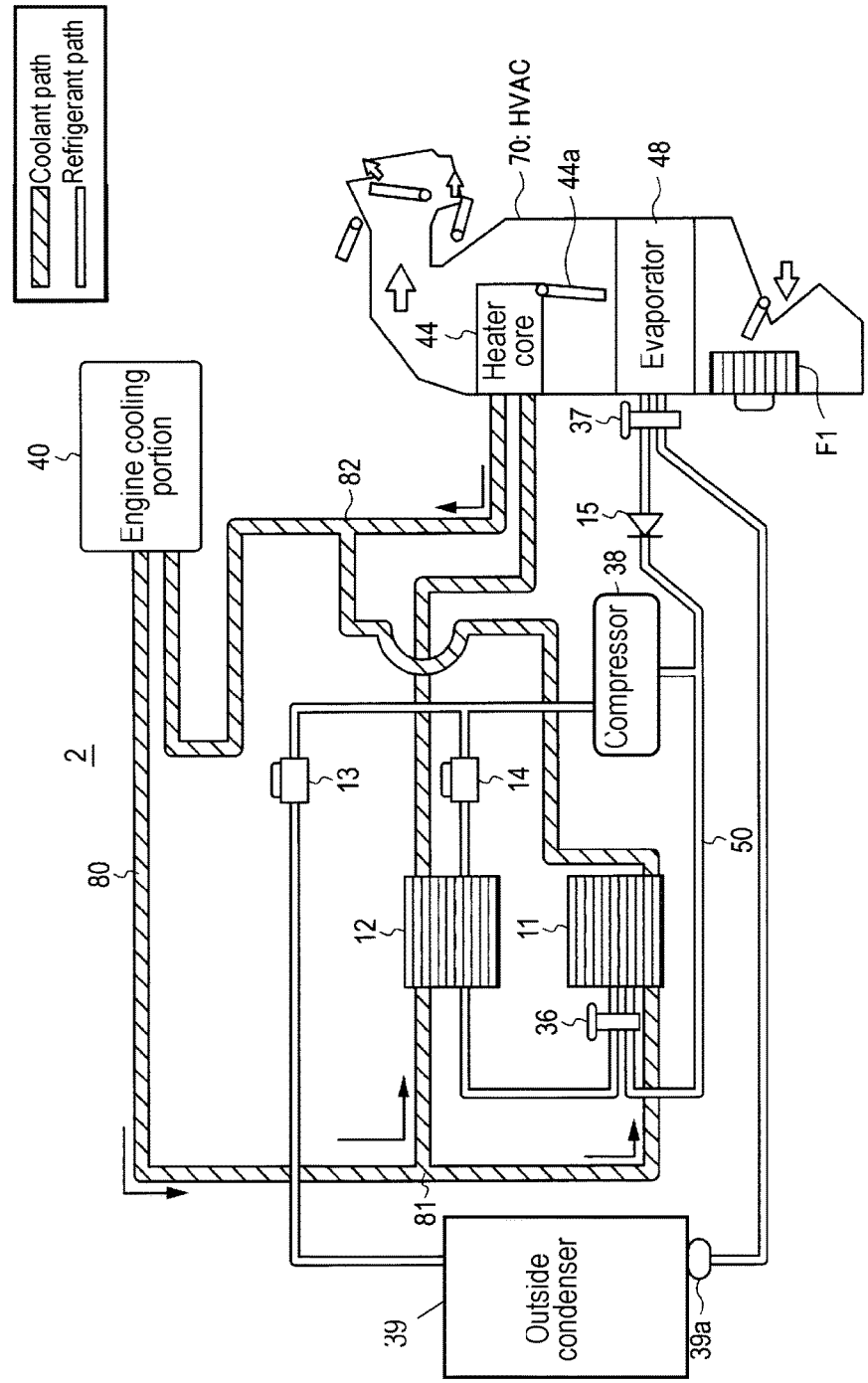
FIG. 2 is a view of a configuration of a vehicle air conditioner according to a second embodiment.

Note that, in FIG. 2, the same parts as those shown in FIG. 1 are designated by the same numerals, and their descriptions may be omitted.

Vehicle air conditioner 2 is a device which is mounted on a vehicle equipped with an engine (internal combustion engine), and is intended to perform air-conditioning of the interior of the vehicle.

Coolant path 80 is a path for circulating the coolant through engine cooling portion 40, first water-refrigerant heat exchanger 11, second water-refrigerant heat exchanger 12, and heater core 44. Coolant path 80 includes: branching portion 81 where the flow of the coolant branches off into two coolant-flows; joining portion 82 where the two coolant-flows having branched off at branching portion 81 join again; first and second parts which are disposed in parallel between branching portion 81 and joining portion 82. Branching portion 81 is disposed downstream from engine cooling portion 40, while joining portion 82 is disposed downstream from heater core 44. A coolant flowing in the second part of coolant path 0 passes through second water-refrigerant heat exchanger 12 and heater core 44 to joining portion 82. On the other hand, a coolant flowing in the first part of coolant path 8 passes through first water-refrigerant heat exchanger 11 to joining portion 82, without passing through heater core 44. That is, first water-refrigerant heat exchanger 11 disposed in the first part of coolant path 80 is coupled in parallel with heater core 44 and second water-refrigerant heat exchanger 12 disposed in the second part of coolant path 80.

Operation of Vehicle Air Conditioner

Next, operations of vehicle air conditioner 2 will be described in detail with reference to FIG. 2, hereinafter.

Heating Mode

In the heating mode, the flow of the coolant fed from engine cooling portion 40 branches off into two coolant-flows at branching portion 81 of coolant path 80, and the coolant-flows are separately fed into first water-refrigerant heat exchanger 11 and second water-refrigerant heat exchanger 12. The coolant fed from second water-refrigerant heat exchanger 12 is fed into heater core 44. Then, the coolant fed from first water-refrigerant heat exchanger 11 and the coolant fed from heater core 44, join at joining portion 82 of coolant path 80, and the thus-joined coolant is conveyed to engine cooling portion 40.

Even with the coolant that flows in this way, the amount of heat released from heater core 44 to the air to be blown into the interior of the vehicle, is given from the following two heat sources. One is the amount of heat obtained from engine cooling portion 40 and the other is the amount of heat that is converted from electric power or dynamic power applied to compressor 38 from the outside. Therefore, vehicle air conditioner 2 according to the second embodiment can provide the same action as that described in the first embodiment, resulting in achievement of the high heating power.

Moreover, also in vehicle air conditioner 2 according to the second embodiment, the flow of the coolant branches off into two coolant-flows which separately flow in parallel through first water-refrigerant, heat exchanger 11 and second water-refrigerant heat exchanger 12. This can reduce an increase in total coolant flow-resistance that is the sum of coolant flow-resistance of first water-refrigerant heat exchanger 11 and coolant flow-resistance of second water-refrigerant heat exchanger 12, even in cases where first water-refrigerant heat exchanger 11 and second water-refrigerant heat exchanger 12 are downsized. Therefore, also in accordance with the second embodiment, it is possible to downsize first water-refrigerant heat exchanger 11 and second water-refrigerant heat exchanger 12 without increase in pressure loss.

Operations in the cooling mode are the same as those of vehicle air conditioner 1 of the first embodiment described above; therefore, their descriptions are omitted.

It is noted, however, that the present disclosure is not limited to the configurations and methods that have been specifically described in the exemplary embodiments. For example, in the embodiments, the constituent elements of the refrigerant circuit through which the refrigerant flows in the cooling mode is not limited to the examples shown in the Figures. Therefore, the embodiments may employ various types of refrigerant circuits. Moreover, the configuration of the refrigerant circuit through which the refrigerant flows in the heating mode may further include other constituent elements in addition to the first water-refrigerant heat exchanger and the second water-refrigerant heater exchanger.

Figure 3:
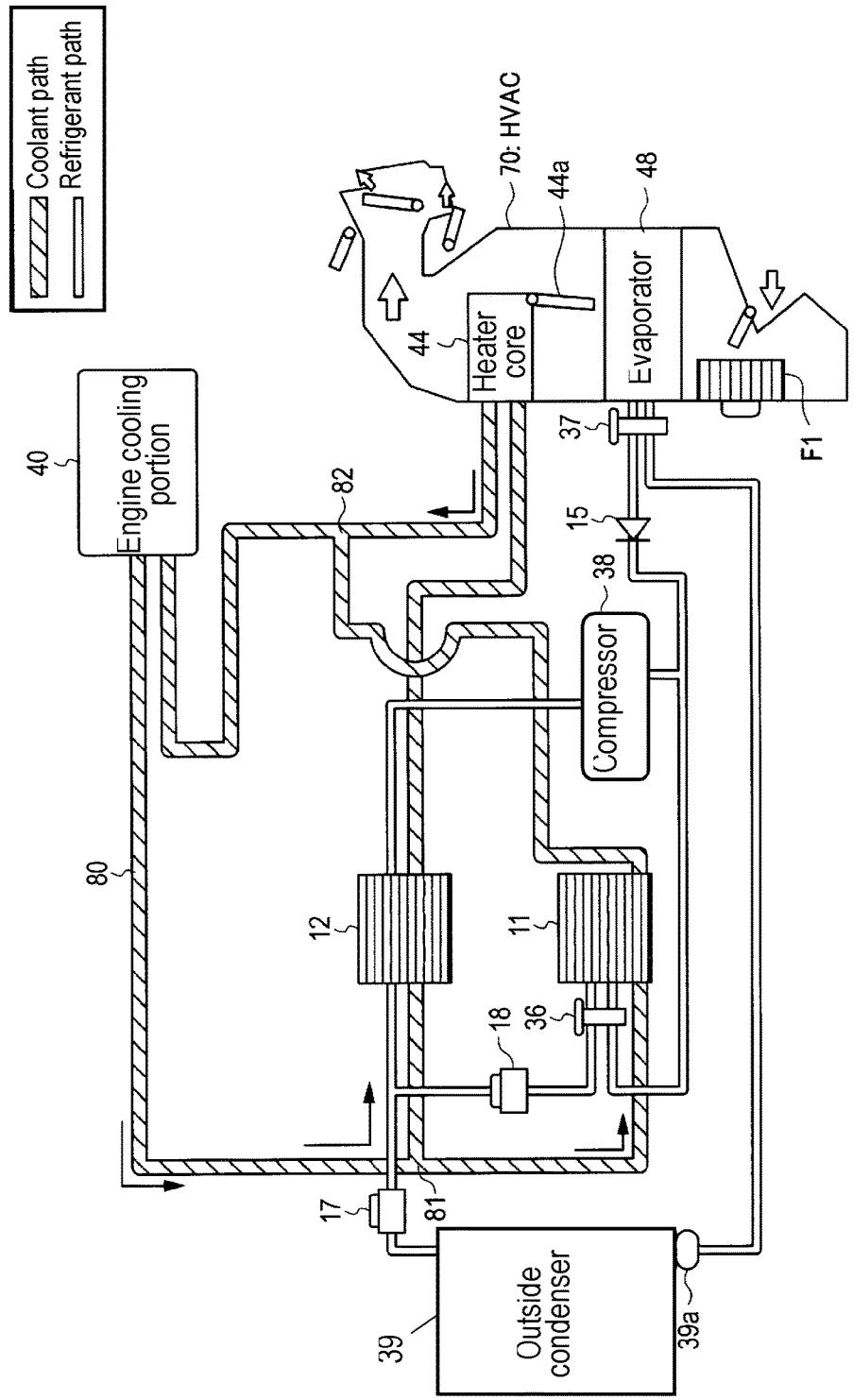
FIG. 3 is a view illustrating a configuration of Modified Example 1 of a refrigerant circuit of the vehicle air conditioner according to the embodiments.
Figure 4:
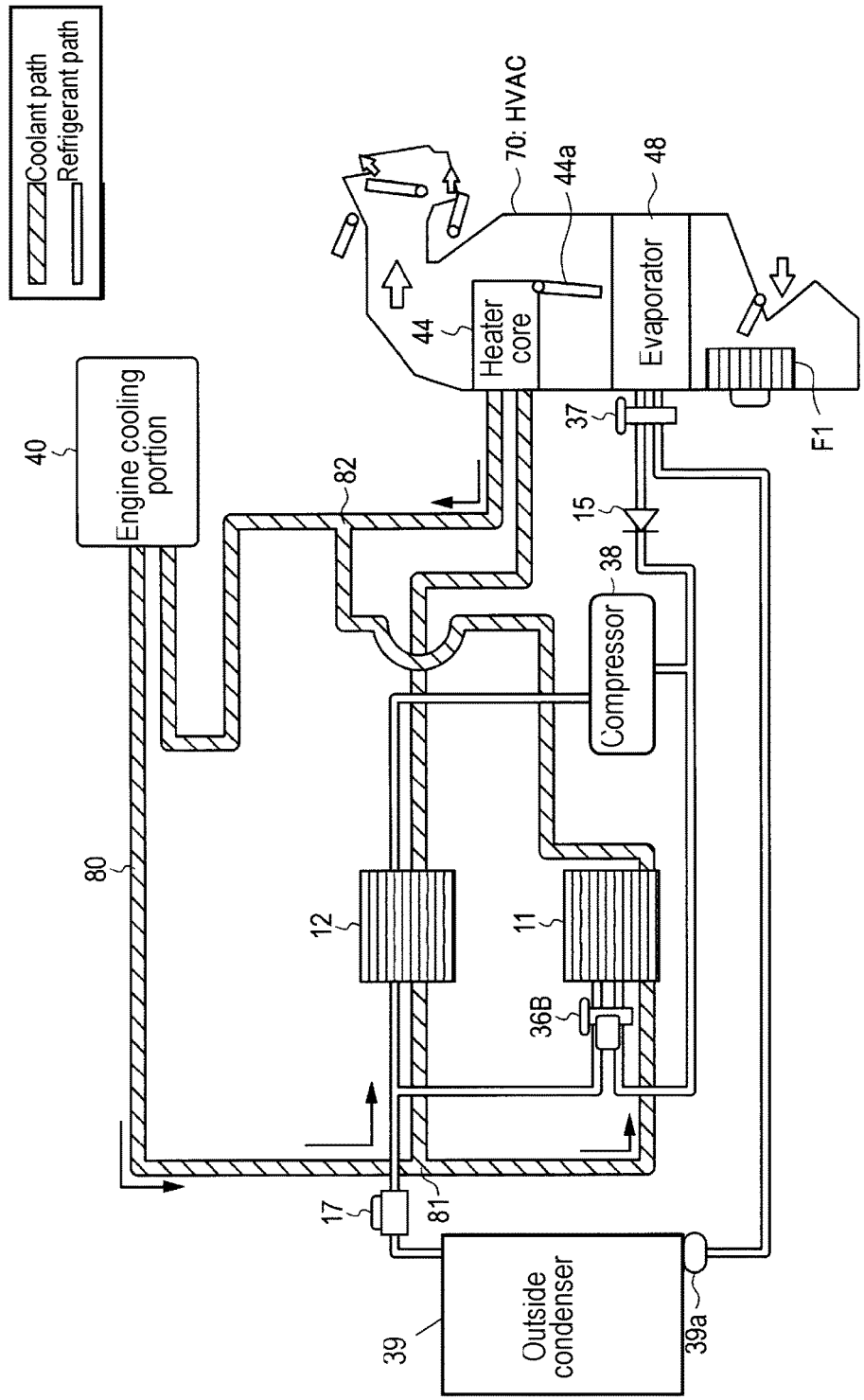
FIG. 4 is a view illustrating a configuration of Modified Example 2 of the refrigerant circuit of the vehicle air conditioner according to the embodiments.
Figure 5:
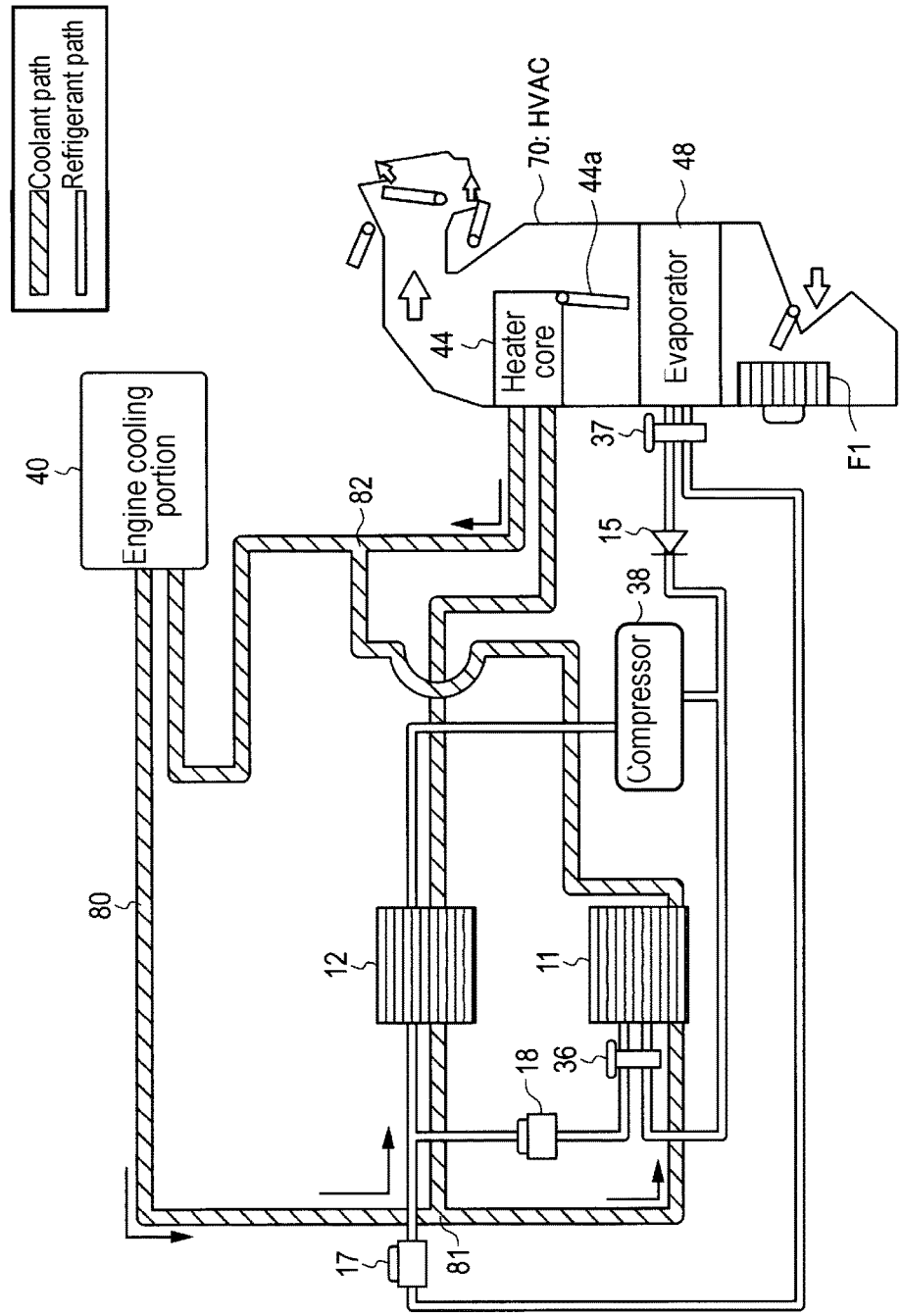
FIG. 5 is a view illustrating a configuration of Modified Example 3 of the refrigerant circuit of the vehicle air conditioner according to the embodiments.
Figure 6:
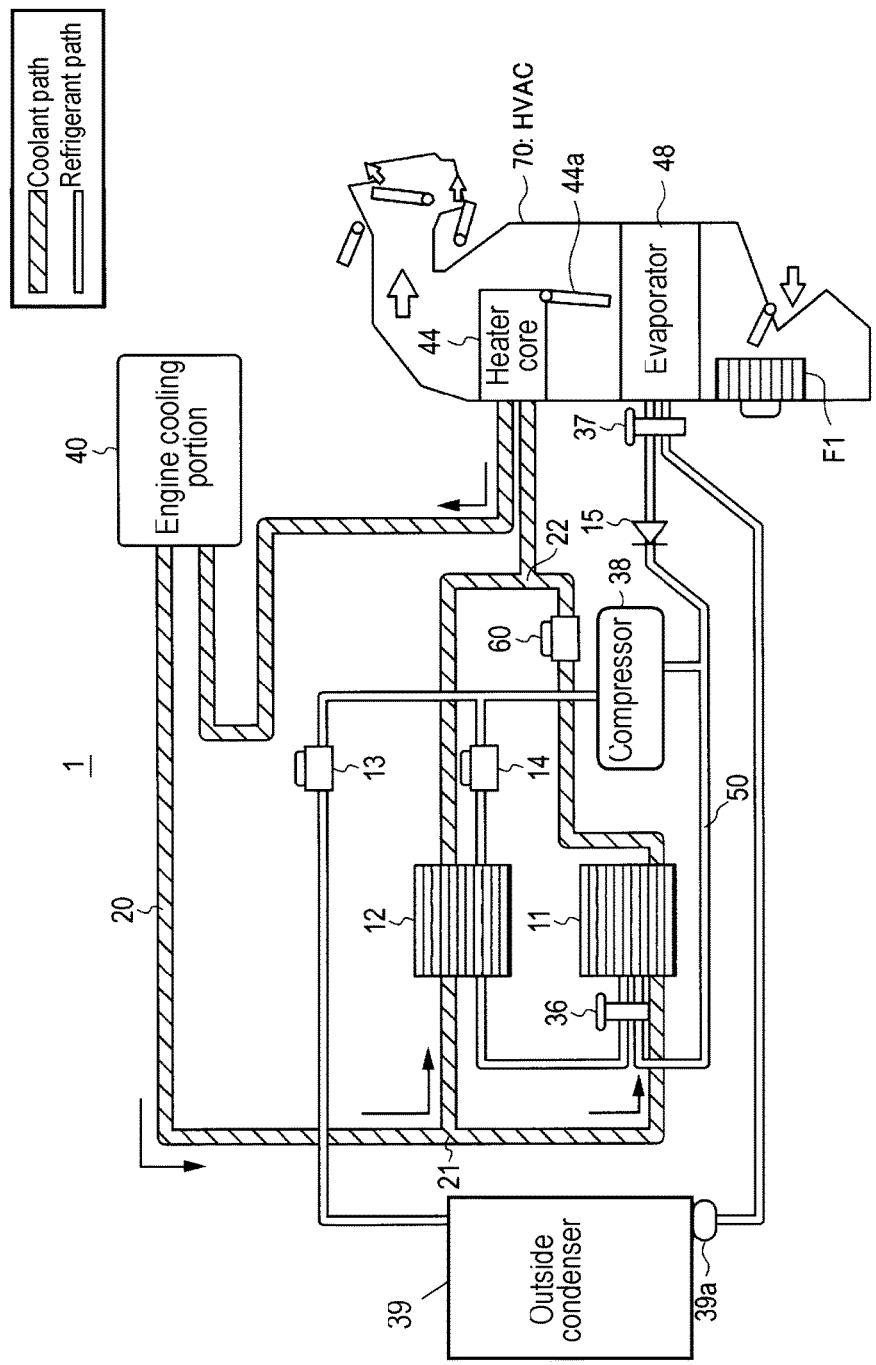
FIG. 6 is a view illustrating a configuration of Modified Example 4 of the refrigerant circuit of the vehicle air conditioner according to the embodiments.
Figure 7:
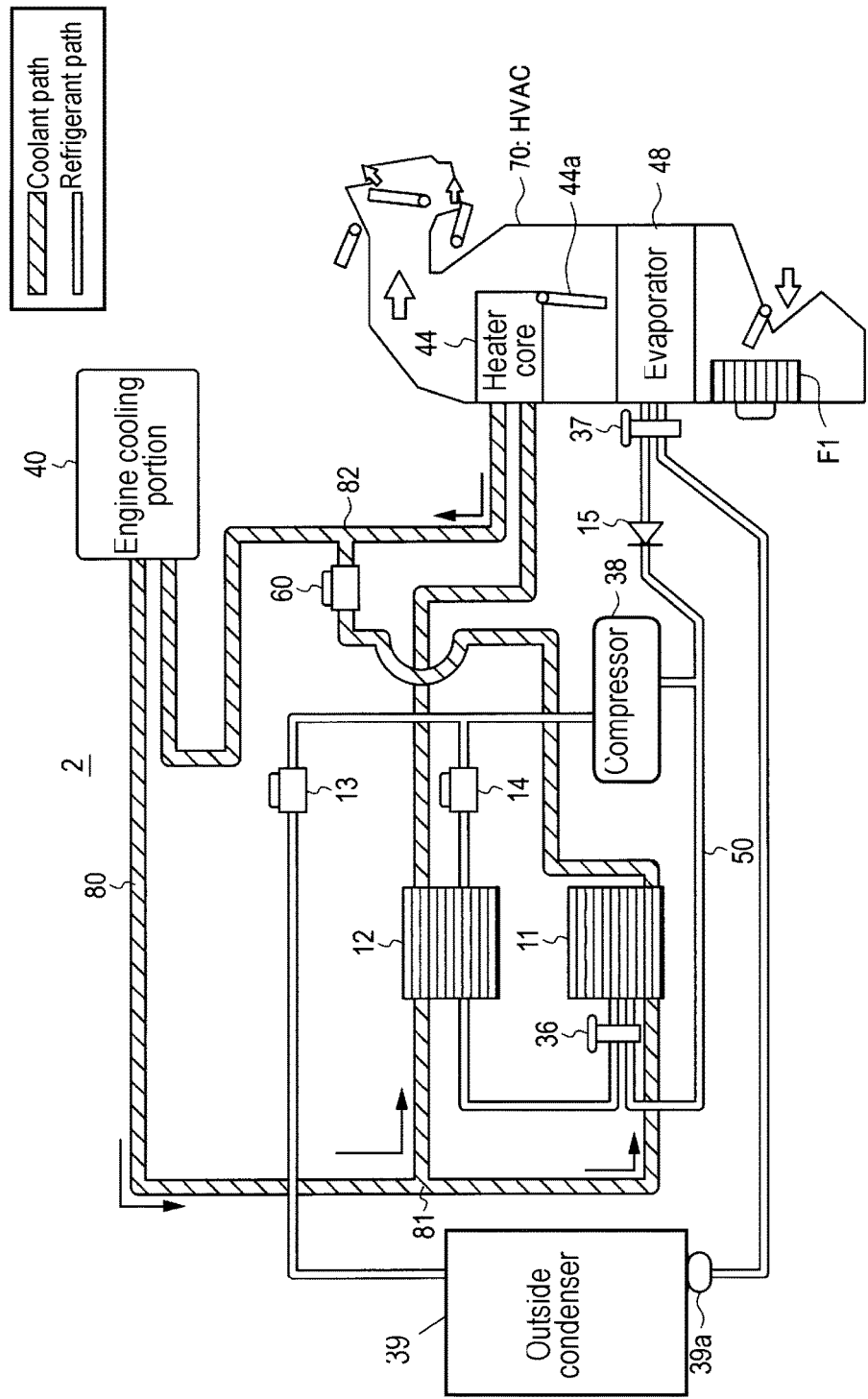
FIG. 7 is a view illustrating a configuration of Modified Example 5 of the refrigerant circuit of the vehicle air conditioner according to the embodiments.

FIG. 3 is a view illustrating a configuration of Modified Example 1 of the refrigerant circuit of the vehicle air conditioner according to the embodiments of the present disclosure. FIG. 4 is a view illustrating a configuration of Modified Example 2 of the refrigerant circuit of the vehicle air conditioner according to the embodiments of the present disclosure. FIG. 5 is a view illustrating a configuration of Modified Example 3 of the refrigerant circuit of the vehicle air conditioner according to the embodiments of the present disclosure. FIG. 6 is a view illustrating a configuration of Modified Example 4 of the refrigerant circuit of the vehicle air conditioner according to the embodiments of the present disclosure. FIG. 7 is a view illustrating a configuration of Modified Example 5 of the refrigerant circuit of the vehicle air conditioner according to the embodiments of the present disclosure.

For example, in the first and second embodiments described above, each of the configurations includes a first refrigerant circuit in which the refrigerant flows through compressor 38, outside condenser 39, expansion valve 37, and evaporator 48. Moreover, in the first and second embodiments described above, each of the configurations includes a second refrigerant circuit in which the refrigerant flows through compressor 38, second water-refrigerant heat exchanger 12, expansion valve 36, and first water-refrigerant heat exchanger 11. Then, each of the configurations includes switches (e.g. on-off valve 13 and on-off valve 14) which can switch the refrigerant's flow such that the refrigerant flows in the first refrigerant circuit in the cooling mode and the refrigerant flows in the second refrigerant circuit in the heating mode.

However, as shown in FIG. 3, the configuration may include a third refrigerant circuit and a fourth refrigerant circuit. In the third refrigerant circuit, the refrigerant flows through compressor 38, second water-refrigerant heat exchanger 12, outside condenser 39, expansion valve 37, and evaporator 48. In the fourth refrigerant circuit, the refrigerant flows through compressor 38, second water-refrigerant heat exchanger 12, expansion valve 36, and first water-refrigerant heat exchanger 11. Then, the configuration may include switches (e.g. on-off valve 17 and on-off valve 18) which can switch the refrigerant's flow such that the refrigerant flows in the third refrigerant circuit in the cooling mode and the refrigerant flows in the fourth refrigerant circuit in the heating mode. On-off valves 17 and 18 may be replaced with one three-way valve. Note that, in the third refrigerant circuit, the refrigerant is condensed not in second water-refrigerant heat exchanger 12 but in outside condenser 39. For this reason, the coolant's flow into second water-refrigerant heat exchanger 12 may be turned off such that second water refrigerant heat exchanger 12 does not perform a thermal exchange between the coolant and the refrigerant. Alternatively, the flow rate of the coolant flowing into second water-refrigerant heat exchanger 12 may be reduced such that only a small amount of heat is exchanged between the coolant and the refrigerant.

Moreover, for example, as shown in FIG. 4, solenoid-valve-equipped expansion valve 36B may be employed, in place of on-off valve 18 and expansion valve 36 which are shown in FIG. 3. Solenoid-valve-equipped expansion valve 36B is a kind of expansion valve which is opened and closed via electrical control such that it functions as an expansion valve when being opened and turns off the flow of the refrigerant when being closed.

Furthermore, for example, as shown in FIG. 5, the refrigerant circuit may be configured without condenser 39. Then, the configuration may include a fifth refrigerant circuit and a sixth refrigerant circuit. In the fifth refrigerant circuit, the refrigerant flows through compressor 38, second water-refrigerant heat exchanger 12, expansion valve 37, and evaporator 48. In the sixth refrigerant circuit, the refrigerant flows through compressor 38, second water-refrigerant heat exchanger 12, expansion valve 36, and first water-refrigerant beat exchanger 11. Then, the configuration may include switches (e.g. on-off valve 17 and on-off valve 18) which can switch the refrigerant flow such that the refrigerant flows in the fifth refrigerant circuit in the cooling mode and the refrigerant flows in the sixth refrigerant circuit in the heating mode. With the configuration shown in FIG. 5, it is required that, in the cooling mode, the refrigerant be condensed in second water-refrigerant heat exchanger 12 by transferring heat from the refrigerant to the coolant. Therefore, in the case shown in FIG. 5, the coolant circuit may be equipped with an additional configuration in which the heat transferred from the refrigerant to the coolant in second water-refrigerant heat exchanger 12 is further transferred to the outside air and the like.

Moreover, for example, as shown in FIG. 6, flow-rate regulating valve 60 may be additionally disposed between first water-refrigerant heat exchanger 11 and joining portion 22 of the refrigerant circuit shown in FIG. 1. Furthermore, for example, as shown in FIG. 7, flow-rate regulating valve 60 may be additionally disposed between first water-refrigerant heat exchanger 11 and joining portion 82 of the refrigerant circuit shown in FIG. 2.

Flow-rate regulating valve 60 (corresponding to an example of a flow-rate regulating portion) shown in FIGS. 6 and 7, regulates the flow rate of the coolant flowing through first water-refrigerant heat exchanger 11 and the flow rate of the coolant flowing through second water-refrigerant heat exchanger 12.

For example, flow-rate regulating valve 60 regulates the flow rates such that the flow rate of the coolant flowing through second water-refrigerant heat exchanger 12 becomes smaller than that before the regulation and the flow rate of the coolant flowing through first water-refrigerant heat exchanger 11 becomes larger than that before the regulation (referred to as first regulation, hereinafter). In the first regulation, the flow rates are regulated such that a ratio of the flow rate of the coolant flowing through second water-refrigerant heat exchanger 12 with respect to the flow rate of the coolant flowing through first water-refrigerant heat exchanger 11 becomes 1:2, for example.

As a result of the first regulation, the temperature of the coolant after having flowed through second water-refrigerant heat exchanger 12 becomes higher than that before the first regulation. Also, the temperature of the coolant that flows from joining portion 22 into heater core 44 becomes higher than that before the first regulation. Therefore, by performing the first regulation, the heating power can be increased. This is effective in cases including: a case where quick-heating performance is required, a case where the pressure of the refrigerant is too low, a case where the temperature of the coolant is too low, and a case where the revolution speed of the engine is too low, for example.

Moreover, for example, flow-rate regulating valve 60 regulates the flow rates such that the flow rate of the coolant flowing through first water-refrigerant heat exchanger 11 becomes smaller than that before the regulation and the flow rate of the coolant flowing through second water-refrigerant heat exchanger 12 becomes larger than that before the regulation (referred to as second regulation, hereinafter). In the second regulation, the flow rates are regulated such that a ratio of the flow rate of the coolant flowing through first water-refrigerant heat exchanger 11 with respect to the flow rate of the coolant flowing through second water-refrigerant heat exchanger 12 becomes 1:2, for example.

As a result of the second regulation, the temperature of the coolant after having flowed through first water-refrigerant heat exchanger 11 becomes lower than that before the second regulation. Also, the temperature of the coolant that flows from joining portion 22 into heater core 44 becomes lower than that before the second regulation. Therefore, by performing the second regulation, the heating power can be decreased. This is effective in cases, for example, where the pressure of the coolant in the path becomes too high accompanying an increase in the output of the engine. Moreover, this is effective also in cases including: a case where the pressure of the refrigerant is too high, a case where the temperature of the coolant is too high, and a case where the revolution speed of the engine is too high, for example.

Note that the switching between the first regulation and the second regulation may be performed by a controller not shown. For example, the controller may control flow-rate regulating valve 60 such that the first regulation is performed when a sensor (not shown in the Figures) capable of sensing the outside-air temperature indicates a sensed value that is lower than a predetermined threshold. Moreover, for example, the controller may control flow-rate regulating valve 60 such that the second regulation is performed when a sensor (not shown in the Figures) capable of sensing the output of the engine indicates a sensed value that is higher than a predetermined threshold.

Moreover, FIGS. 6 and 7 show the examples in which flow-rate regulating valve 60 is disposed between first water-refrigerant heat exchanger 11 and either joining portion 22 or joining portion 82: however, the location of flow-rate regulating valve 60 is not limited to this. For example, in FIG. 6, flow-rate regulating valve 60 may be disposed in branching portion 21, joining portion 22, or a predetermined position between branching portion 21 and joining portion 22. Moreover, for example, in FIG. 7, flow-rate regulating valve 60 may be disposed in branching portion 81, joining portion 82, or a predetermined position between branching portion 81 and joining portion 82.

Moreover, the flow-rate regulating portion has been described using the example of flow-rate regulating valve 60; however, the flow-rate regulating, portion is not limited to this. For example, the flow-rate regulating portion may employ either a three-way valve or a water pump which has the same function as that of flow-rate regulating valve 60. When the three-way valve is used as the flow-rate regulating portion, the three-way valve is disposed in either the branching portion or the joining portion, for example.

In the embodiments described above, the descriptions have been made using the example in which compressor 38 is driven by the dynamic power of the engine; however, compressor 38 may be driven by electric power. Electrically-driven compressor 38 converts the electric power supplied from the outside into motion to compress the refrigerant. For this reason, a high electric power can be supplied to compressor 38.

The technology according to the present disclosure can be preferably used in vehicle air conditions mounted to vehicles.

What is claimed is:

1. A vehicle air conditioner comprising:
   a coolant path coupled with a cooling portion of a heat-generating component of a vehicle, and configured to circulate a coolant for transferring heat;
   a refrigerant path including an evaporator and a first expansion valve, and configured to circulate a refrigerant;
   a compressor disposed in the refrigerant path, and configured to compress the refrigerant;
   a first water-refrigerant heat exchanger disposed in the coolant path and the refrigerant path, and configured to vaporize the refrigerant by performing a thermal exchange between the coolant and a first portion of the refrigerant that is at a low-temperature and a low-pressure, the first portion of the refrigerant being produced by reducing a pressure of the refrigerant when the refrigerant passes through the first expansion valve;
   a second water-refrigerant heat exchanger disposed in the coolant path and the refrigerant path, and configured to condense the refrigerant by performing a thermal exchange between the coolant and a second portion of the refrigerant that is at a high-temperature and a high-pressure, the second portion of the refrigerant being produced by compressing the refrigerant with the compressor after the refrigerant has passed through the first water-refrigerant heat exchanger; and
   a heater core disposed in the coolant path, and configured to heat air to be blown into an interior of the vehicle, wherein the coolant path includes:
  a branching portion configured to cause the coolant to branch off into two branched flows;
  a joining portion configured to cause the two branched flows of the coolant to join; and
  first and second parts configured to branch off at the branching portion, and join at the joining portion;
the first water-refrigerant heat exchanger is disposed in the first part of the coolant path;
the second water-refrigerant heat exchanger is disposed in the second part of the coolant path; and
a check valve configured to prevent the refrigerant from flowing into the evaporator, the refrigerant having been fed from the first water-refrigerant heat exchanger, the check valve being disposed fluidly between the evaporator and the first water-refrigerant heat exchanger such that the refrigerant flowing from the check valve to the first water-refrigerant heat exchanger first flows through the compressor and the second water-refrigerant heat exchanger, in this order, before flowing through the first water-refrigerant heat exchanger.

2. The vehicle air conditioner according to claim 1,
wherein the branching portion causes the coolant to branch off into the two branched flows, the coolant being fed from the cooling portion of the heat-generating component of the vehicle; and
the joining portion causes the two branched flows of the coolant to join for producing a joined flow, and feeds the joined flow to the heater core.

3. The vehicle air conditioner according to claim 1,
wherein the branching portion causes the coolant to branch off into the two branched flows, the coolant being fed from the cooling portion of the heat-generating component of the vehicle;
the joining portion causes the two branched flows of the coolant to join for producing a joined flow, and feeds the joined flow to the cooling portion of the heat-generating component of the vehicle; and
the coolant path is configured such that the coolant having passed through the second water-refrigerant heat exchanger passes through the heater core and flows into the joining portion, and such that the coolant having passed through the first water-refrigerant heat exchanger flows into the joining portion without passing through the heater core.

4. The vehicle air conditioner according to claim 1, further comprising:
an outside condenser configured to condense the second portion of the refrigerant by performing a thermal exchange between outside air and the second portion of the refrigerant compressed by the compressor;
a second expansion valve disposed in the refrigerant path, and configured to produce the first portion of the refrigerant by reducing a pressure of the refrigerant having passed through the outside condenser; and
an evaporator configured to perform a thermal exchange between the air to be blown into the interior of the vehicle and the first portion of the refrigerant produced by the second expansion valve,
wherein the refrigerant path includes:
  a first refrigerant circuit configured to circulate the refrigerant through the compressor, the second water-refrigerant heat exchanger, the first expansion valve, and the first water-refrigerant heat exchanger in this order;
  a second refrigerant circuit configured to circulate the refrigerant through the compressor, the outside condenser, the second expansion valve, and the evaporator in this order; and
  a switch configured to switch the first refrigerant circuit and the second refrigerant circuit to one another.

* * * * *